United States Patent
Yu et al.

(10) Patent No.: US 9,421,831 B2
(45) Date of Patent: Aug. 23, 2016

(54) MAGNETIC FORCE TRANSMISSION TYPE TIRE PRESSURE SENSOR DEVICE AND RELATED SETTING TOOL AND SETTING METHOD

(71) Applicant: CUB ELECPARTS INC., Fuxing Township, Changhua County (TW)

(72) Inventors: San-Chuan Yu, Fuxing Township, Changhua County (TW); Tsan-Nung Wang, Hemei Township, Changhua County (TW); Ying-Pi Chen, Hemei Township, Changhua County (TW)

(73) Assignee: CUB ELECPARTS INC., Fuxing Township, Changhua County (TW)

( * ) Notice: Subject to any disclaimer, the term of this patent is extended or adjusted under 35 U.S.C. 154(b) by 213 days.

(21) Appl. No.: 13/918,120

(22) Filed: Jun. 14, 2013

(65) Prior Publication Data

US 2014/0368325 A1    Dec. 18, 2014

(51) Int. Cl.
*B60C 23/00*   (2006.01)
*B60C 23/04*   (2006.01)

(52) U.S. Cl.
CPC ......... *B60C 23/0461* (2013.01); *B60C 23/0471* (2013.01); *B60C 23/0479* (2013.01)

(58) Field of Classification Search
None
See application file for complete search history.

(56) References Cited

U.S. PATENT DOCUMENTS

| | | | |
|---|---|---|---|
| 2006/0156802 A1* | 7/2006 | Cohen | 73/146 |
| 2008/0094198 A1* | 4/2008 | Yu | 340/447 |
| 2009/0289783 A1* | 11/2009 | Kim | 340/447 |
| 2011/0304454 A1* | 12/2011 | Lickfelt et al. | 340/447 |
| 2012/0029759 A1* | 2/2012 | Suh et al. | 701/29 |
| 2013/0162422 A1* | 6/2013 | Colarelli et al. | 340/442 |
| 2014/0043153 A1* | 2/2014 | Lim | 340/447 |

* cited by examiner

*Primary Examiner* — Julie Lieu
(74) *Attorney, Agent, or Firm* — Muncy, Geissler, Olds & Lowe, P.C.

(57) ABSTRACT

A magnetic force transmission type tire pressure sensor device and related setting tool and setting method is disclosed. The invention uses a magnetic force sensor unit in the tire pressure sensor device to receive lines of magnetic flux being transmitted by a magnetic force transmitter unit in the setting tool, and then the received waveform is converted into a communication protocol and stored in the tire pressure sensor device. Therefore, the invention not only can achieve the purpose of wireless transmission but also can enhance the stability of signal transmission, eliminate wireless regulatory constraints and improve product quality.

5 Claims, 4 Drawing Sheets

MAGNETIC FORCE TRANSMISSION TYPE TIRE PRESSURE SENSOR DEVICE AND RELATED SETTING TOOL AND SETTING METHOD

BACKGROUND OF THE INVENTION

1. Field of the Invention

The present invention relates to tire pressure monitoring technology and more particularly, to a magnetic force transmission type tire pressure sensor device and the related setting tool and setting method for setting the magnetic force transmission type tire pressure sensor device.

2. Description of the Related Art

Setting of commercial tire pressure sensor devices during installation is done in a wireless manner, i.e., using a setting tool to transmit a predetermined communication protocol or ID data to the tire pressure sensor device to finish the setting. Sending a signal by radio needs to modulate the dominant frequency to a predetermined level more than ten times over the frequency of the data. In consequence, the dominant frequency drive circuit and the mating demodulator circuit are complicated and consume much electrical power during operation. Further, extending the transmission distance of a radio signal requires a larger transmission power, however, long transmission distance is susceptible to interference or can cause signal distortion due to Doppler effect. Further, in various countries, it needs to apply for permission to sell wireless signal transmission equipment. All these issues still have room for improvement

SUMMARY OF THE INVENTION

The present invention has been accomplished under the circumstances in view. It is the main object of the present invention to provide a magnetic force transmission type tire pressure sensor device and the related setting tool and setting method, which utilizes a magnetic force to transmit a wireless signal without any carrier, simplifying the circuit design, saving electrical power consumption and being free from the restrictions of telecommunication regulations.

To achieve this and other objects of the present invention, a magnetic force transmission type tire pressure sensor device and related setting tool and setting method in accordance with the present invention includes: a tire pressure sensor device having installed therein a magnetic force sensor unit for sensing lines of magnetic flux being transmitted by a magnetic force transmitter unit in a setting tool. The magnetic force sensor unit outputs the waveform of the sensed magnetic force to a microcontroller unit of the tire pressure sensor device where the microcontroller unit converts the received data into the original control program.

Other advantages and features of the present invention will be fully understood by reference to the following specification in conjunction with the accompanying drawings, in which like reference signs denote like components of structure.

DETAILED DESCRIPTION OF THE INVENTION

Figure 1:
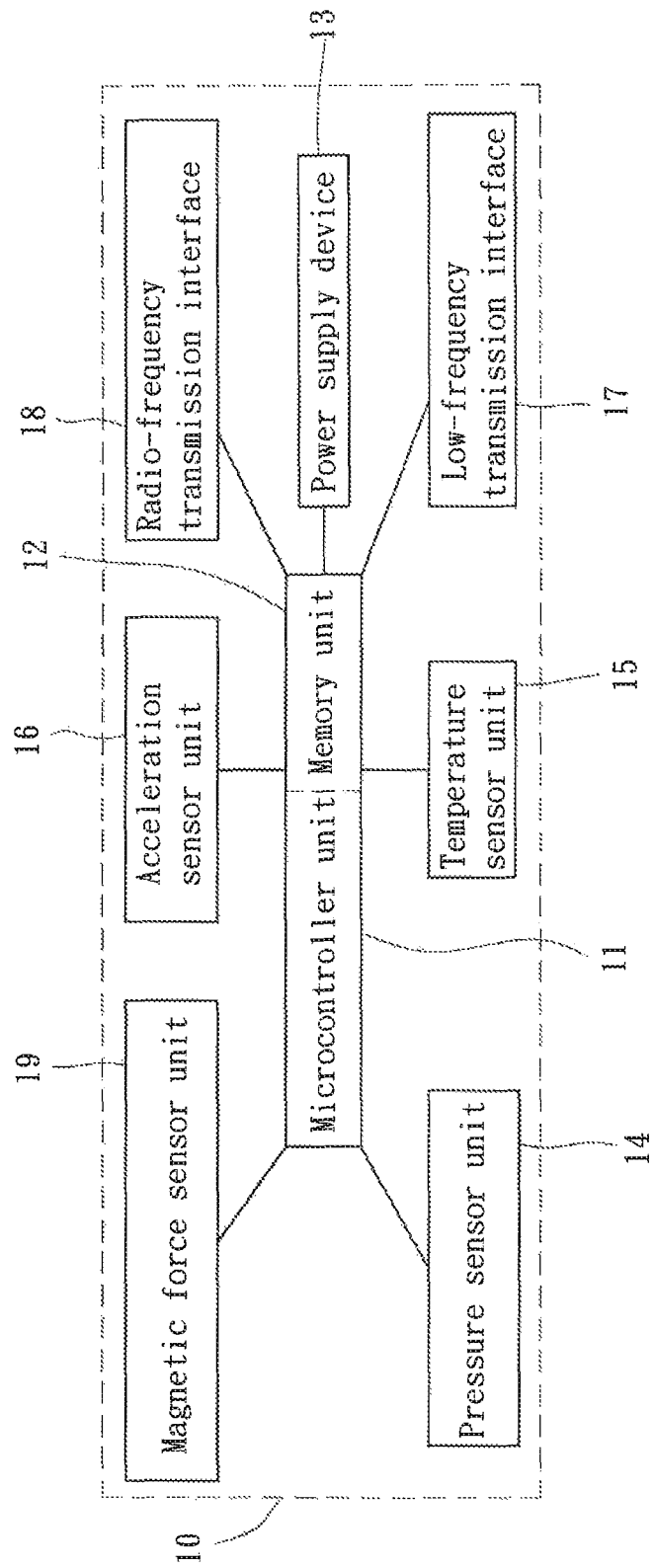
FIG. 1 is a functional block diagram of a magnetic force transmission type tire pressure sensor device in accordance with a first embodiment of the present invention.
Figure 2:
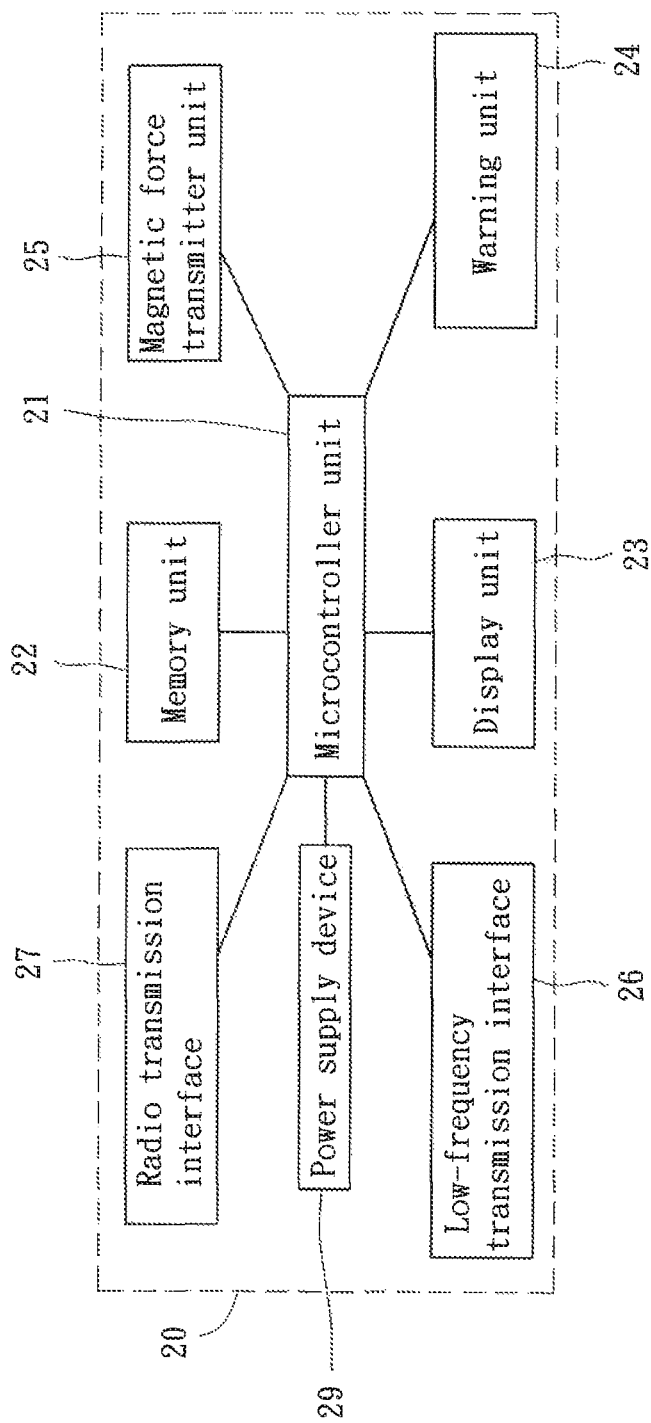
FIG. 2 is a functional block diagram of a magnetic force transmission type tire pressure sensor device setting tool in accordance with the present invention.
Figure 3:
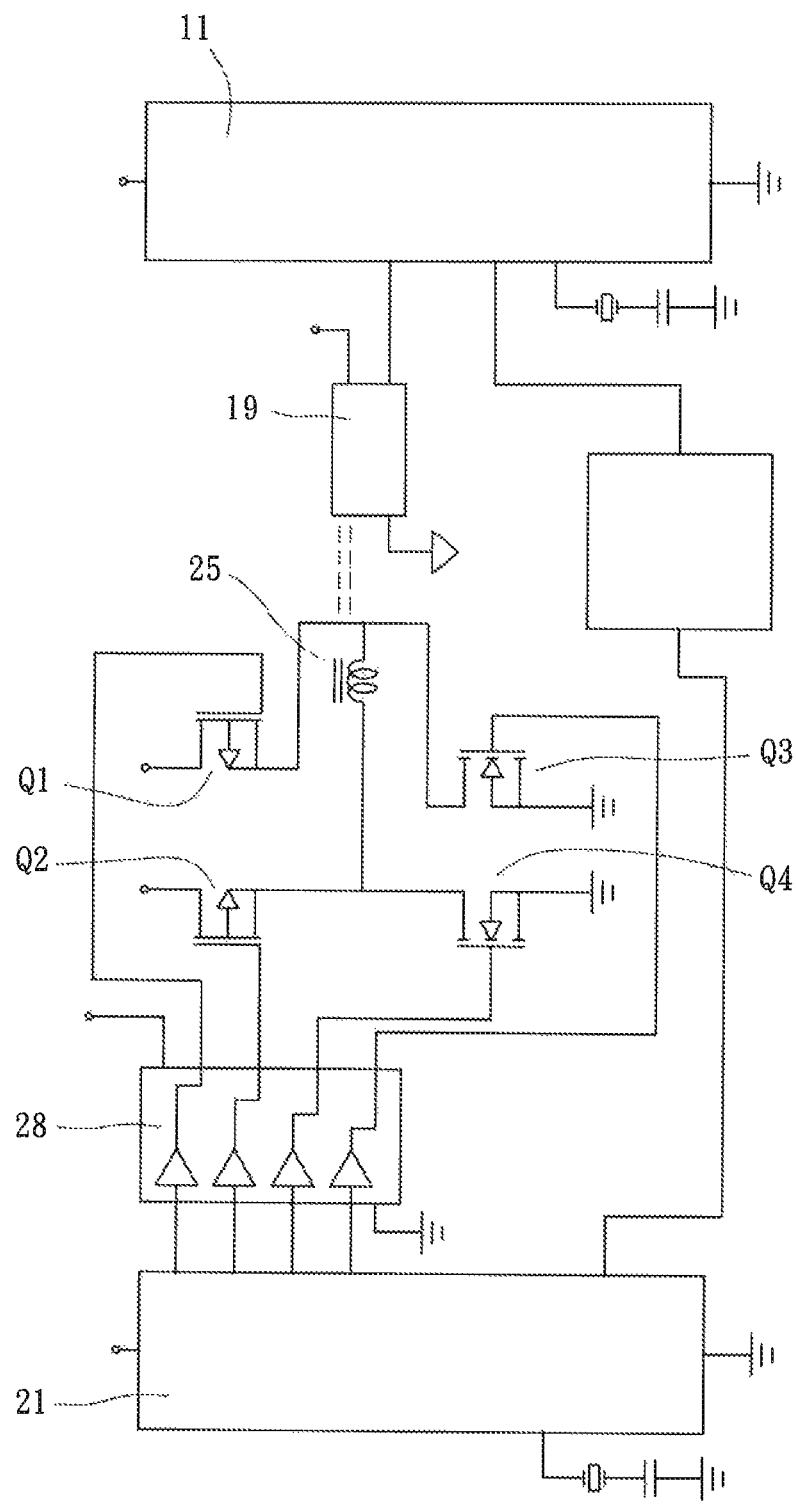
FIG. 3 is a circuit diagram of a part of the tire pressure sensor device setting tool and the tire pressure sensor device.

Referring to FIGS. 1-3, a magnetic force transmission type tire pressure sensor device and setting tool system in accordance with the present invention comprises a tire pressure sensor device 10 and a setting tool 20 mating the tire pressure sensor device 10.

The tire pressure sensor device 10, as shown in FIG. 1, comprises a microcontroller unit 11, a memory unit 12 electrically connected to the microcontroller unit 11, a power supply device 13, for example, a battery cell electrically connected to the microcontroller unit 11 and adapted to provide the tire pressure sensor device 10 with the necessary working electricity, a pressure sensor unit 14 electrically connected to the microcontroller unit 11 and adapted to measure the internal air pressure of the tire, a temperature sensor unit 15 electrically connected to the microcontroller unit 11 and adapted to measure the internal temperature of the tire, an acceleration sensor unit 16 electrically connected to the microcontroller unit 11 and adapted to measure the acceleration of the tire, a low-frequency transmission interface 17 electrically connected to the microcontroller unit 11 and adapted to transmit a low-frequency signal at 315 MHz or 433 MHz to an on-vehicle main unit or setting tool, a radio-frequency transmission interface 18 electrically connected to the microcontroller unit 11 and adapted to transmit a radio signal to the on-vehicle main unit or setting tool, and a magnetic force sensor unit 19, for example, hall sensor electrically connected to the microcontroller unit 11 and adapted to sense the variation of a magnetic field and to convert the sensed waveform of the magnetic field into a corresponding signal and to output the signal to the microcontroller unit 11. Further, the tire pressure sensor device 10 can be configured including only one of the low-frequency transmission interface 17 and the radio transmission interface 18, or having both of them installed therein. Or alternatively, one of the low-frequency transmission interface 17 and the radio transmission interface 18 can be made in the form of a wire connection terminal for wired application.

The setting tool 20 is configured to match the tire pressure sensor device 10. As shown in FIG. 2, the setting tool 20 comprises a microcontroller unit 21, a memory unit 22 electrically connected to the microcontroller unit 21 and adapted to store the ID of the tire pressure sensor device and related communication protocol data, a display unit 23 electrically connected to the microcontroller unit 21 and adapted to display the operating data of the setting tool 20, a warning unit 24 electrically connected to the microcontroller unit 21 and controllable by the microcontroller unit 21 to provide a visual or audio warning signal, a magnetic force transmitter unit 25 electrically connected to the microcontroller unit 21 and controllable by the microcontroller unit 21 to transmit lines of magnetic flux, a low-frequency transmission interface 26 electrically connected to the microcontroller unit 21 and adapted to receive a low-frequency feedback signal transmitted by the tire pressure sensor device 10, a radio-frequency transmission interface 27 electrically connected to the microcontroller unit 21 and adapted to receive a radio feedback signal transmitted by the tire pressure sensor device 10, and a power supply device 29 adapted to provide the setting tool 20 with the necessary working electricity. Further, the setting tool 20 can be configured including only one of the low-frequency transmission interface 26 and the radio transmission interface 27, or having both of them installed therein. Or alternatively, one of the low-frequency transmission interface 26 and the radio transmission interface 27 can be made in the form of a wire connection terminal for wired application.

FIG. 3 is a circuit diagram of a part of the setting tool 20 and the tire pressure sensor device 10. The microcontroller unit 21 of the setting tool 20 is electrically connected to four switches 28 for controlling four transistors, namely, the first transistor Q1, the second transistor Q2, the third transistor Q3 and the fourth transistor Q4. The microcontroller unit 21 is also electrically connected to a bridge circuit formed of the aforesaid magnetic force transmitter unit 25. Further, the third transistor Q3 and the fourth transistor Q4 are grounded. In this embodiment, the magnetic force transmitter unit 25 is an electromagnet.

Figure 4:
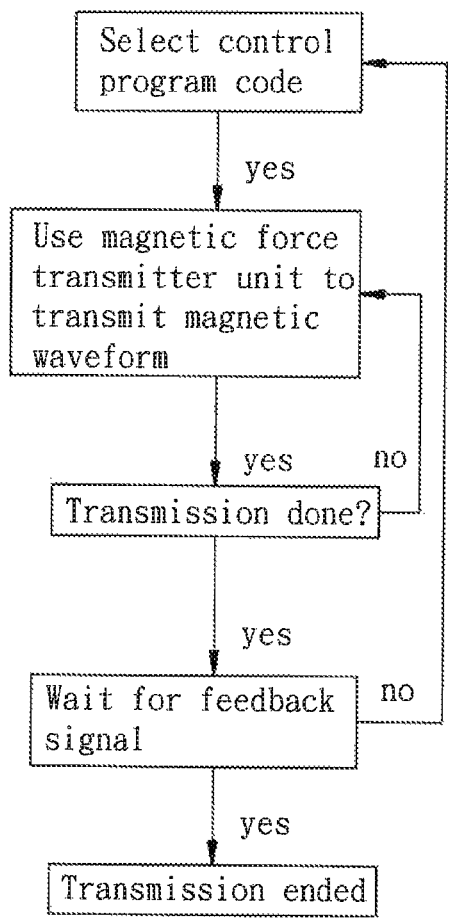
FIG. 4 is a tire pressure sensor device setting tool operating flow chart in accordance with the present invention.
Figure 5:
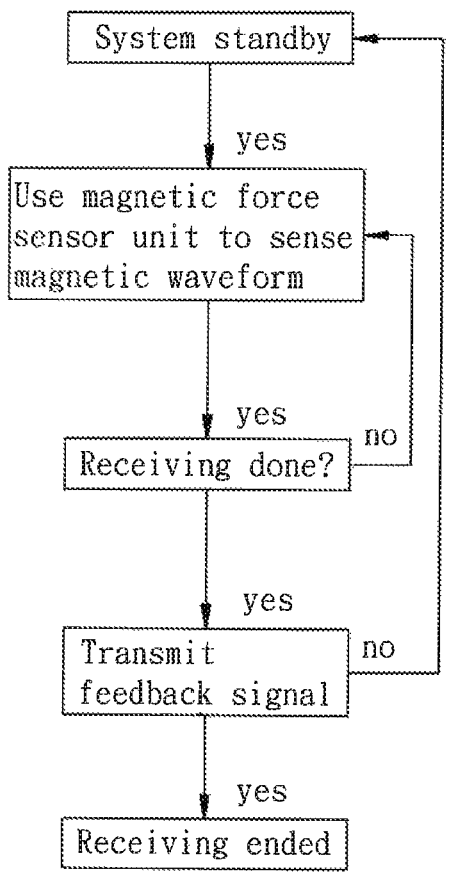
FIG. 5 is a tire pressure sensor device operating flow chart in accordance with the present invention.

Referring to FIG. 4 and FIG. 5, based on the aforesaid tire pressure sensor device and setting tool, the operation of the present invention is outlined hereinafter. At first, select from the setting tool 20 the desired control program to be downloaded onto the tire pressure sensor device 10. The control program varies with different car manufacturers and different car models. Thereafter, the microcontroller unit 21 of the setting tool 20 encodes the selected control program and then provides the encoded control program to the magnetic force transmitter unit 25 for transmission. The control can be done by, for example, enabling the microcontroller unit 21 to control the first transistor Q1 and the fourth transistor Q4 to be electrically conducted, and the second transistor Q2 and the third transistor Q3 to be electrically disconducted, thereby electrically conducting the electromagnet. At this time, the magnetic force sensor unit 19 of the tire pressure sensor device 10 will get to the N pole, and will then output Hi to the microcontroller unit 11 of the tire pressure sensor device 10. If the microcontroller unit 21 controls the first transistor Q1 and the fourth transistor Q4 to be electrically disconducted, and the second transistor Q2 and the third transistor Q3 to be electrically conducted, the electromagnet will be conducted. At this time, the magnetic force sensor unit 19 of the tire pressure sensor device 10 will get to the S pole, and will then output Lo to the microcontroller unit 11 of the tire pressure sensor device 10.

Subject to the above-stated structural al features and control manner of the present invention, the magnetic force transmitter unit 25 of the setting tool 20 can be controlled to transmit the predetermined control program to the tire pressure sensor device 10. After received the waveform outputted by the magnetic force sensor unit 19, the microcontroller unit 11 of the tire pressure sensor device 10 restores the original control program by calculation, and then stores the control program in the memory unit 12. The tire pressure sensor device setting tool 20 will repeatedly transmit the control program and wait for a feedback signal from the tire pressure sensor device 10. Upon receipt of data, the microcontroller unit 11 of the tire pressure sensor device 10 makes calculations for error detection. If the received data is correct, the tire pressure sensor device 10 will provide a feedback signal to the tire pressure sensor device setting tool 20 via the radio transmission interface, low-frequency transmission interface, or wired transmission interface. The tire pressure sensor device setting tool stops the transmission of the control program immediately upon receipt of the feedback signal. In this embodiment, the control program can be a predetermined communication protocol, the ID of the tire pressure sensor device, or the combination of the predetermined communication protocol and the ID of the tire pressure sensor device.

As shown in FIG. 5, if the data received by the tire pressure sensor device 10 is incorrect, the tire pressure sensor device 10 will not provide any feedback signal to the tire pressure sensor device setting tool 20. Before receiving a feedback signal, the tire pressure sensor device setting tool 20 will transmit the control program to the tire pressure sensor device again, and this operation will be repeatedly performed till that the tire pressure sensor device setting tool 20 receives a feedback signal.

Further, in order to eliminate the problem of counter-electromotive force (back electromotive force), the first transistor Q1 and the second transistor Q2, enabling the third transistor Q3 and the fourth transistor Q4 to be electrically conducted, or all the first through fourth transistors Q1-Q4 can be electrically disconducted, allowing bidirectional quick conversion of the magnetic force drive circuit. However, it is to be noted that the magnetic force drive circuit of the tire pressure sensor device setting tool is not limited to the design illustrated, instead of the illustrated four-switch double-loop design, the magnetic force drive circuit can be made in the form of a single loop using one single switch to control one single transistor and the magnetic force transmitter unit, achieving the same magnetic force output effect. Using magnetic force to transmit signal not only can achieve a wireless signal transmission effect but also simplify the circuit design and save power consumption. Further, this method eliminates wireless regulatory constraints and significantly improves the drawbacks of the prior art design, achieving the objects of the present invention.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire pressure sensor device setting tool, comprising:
   a microcontroller unit;
   a memory unit electrically connected to said microcontroller unit and adapted to store the ID of a tire pressure sensor device and related communication protocol data;
   a display unit electrically connected to said microcontroller unit and adapted to display the operating data of the setting tool;
   a magnetic force transmitter unit electrically connected to said microcontroller unit and controllable by said microcontroller unit to transmit lines of magnetic flux;
   a low-frequency transmission interface electrically connected to said microcontroller unit and adapted to receive a low-frequency feedback signal transmitted by said tire pressure sensor device;
   first to fourth switches electrically connected to the microcontroller unit and adapted to control first to fourth transistors, the third and fourth transistors being grounded; and
   a bridge circuit electrically connected to the microcontroller unit and being formed of the magnetic force transmitter unit,
   wherein said magnetic force transmitter unit is an electromagnet,
   wherein if the microcontroller unit controls the first and fourth transistors to be electrically conducted and the second and third transistors to be electrically disconducted, the electromagnet is electrically conducted, and the magnetic force sensor unit becomes the N pole and then outputs Hi to the microcontroller unit, wherein if the microcontroller unit controls the first and fourth transistors to be electrically disconducted, and the second and third transistors to be electrically conducted, the electromagnet is electrically conducted, and the magnetic force sensor unit becomes the S pole and then outputs Lo to the microcontroller unit, wherein the magnetic force transmitter unit is controlled to transmit a predetermined control program to the tire pressure sensor device, and wherein, after receiving a waveform outputted by the magnetic force sensor unit, the microcontroller unit restores the original control program by calculation, and then stores the control program in the memory unit.

2. The tire pressure sensor device setting tool as claimed in claim 1, further comprising a radio-frequency transmission interface electrically connected to said microcontroller unit and adapted to receive a radio feedback signal transmitted by said tire pressure sensor device.

3. The tire pressure sensor device setting tool as claimed in claim 1, further comprising a warning unit electrically connected to said microcontroller unit and controllable by said microcontroller unit to provide a warning signal.

4. A tire pressure sensor device setting method, comprising the steps of:

providing a tire pressure sensor device comprising a microcontroller unit, a memory unit and a magnetic force sensor unit;

providing a tire pressure sensor device setting tool comprising a microcontroller unit, a magnetic force transmitter unit, first to fourth switches and a bridge circuit, the first to fourth switches being electrically connected to the microcontroller unit and adapted to control first to fourth transistors, the third and fourth transistors being grounded, a bridge circuit being electrically connected to the microcontroller unit and being formed of the magnetic force transmitter unit;

operating said tire pressure sensor device setting tool to select a control program to be unloaded onto said tire pressure sensor device, enabling the selected control program to be encoded by the microcontroller unit of said tire pressure sensor device setting tool and then transmitted by said magnetic force transmitter unit to said magnetic force sensor unit of said tire pressure sensor device;

enabling the microcontroller unit of said tire pressure sensor device to decode the encoded control program been sensed by said magnetic force sensor unit and then to store the decoded control program in said memory unit;

if the microcontroller unit controls the first and fourth transistors to be electrically conducted and the second and third transistors to be electrically disconducted, electrically conducting the electromagnet to make the magnetic force sensor unit an N pole, outputting Hi to the microcontroller unit;

if the microcontroller unit controls the first and fourth transistors to be electrically disconducted, and the second and third transistors to be electrically conducted, electrically conducting the electromagnet to make the magnetic force sensor unit becomes an S pole, and outputting Lo to the microcontroller unit;

controlling the magnetic three transmitter unit to transmit a predetermined control program to the tire pressure sensor device; and after receiving a waveform outputted by the magnetic force sensor unit, restoring the original control program by calculation by the microcontroller unit, and then storing the control program in the memory unit, wherein said control program comprises a tire pressure sensor device communication protocol.

5. The tire pressure sensor device setting method as claimed in claim 4, wherein said control program comprises the ID code of said tire pressure sensor device.

* * * * *